United States Patent
Suzuki

(10) Patent No.: US 9,203,317 B2
(45) Date of Patent: Dec. 1, 2015

(54) LOAD DRIVER WITH FIRST AND SECOND SERIES CONVERTERS

(71) Applicant: MINEBEA CO., LTD., Kitasaku-Gun, Nagano (JP)

(72) Inventor: Shinichi Suzuki, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 222 days.

(21) Appl. No.: 14/014,816

(22) Filed: Aug. 30, 2013

(65) Prior Publication Data

US 2014/0241013 A1 Aug. 28, 2014

(30) Foreign Application Priority Data

Feb. 28, 2013 (JP) .................................. 2013-038578

(51) Int. Cl.
*H02M 3/335* (2006.01)
*H05B 33/08* (2006.01)
*H02M 7/217* (2006.01)
*H02M 1/00* (2007.01)

(52) U.S. Cl.
CPC ....... *H02M 3/33507* (2013.01); *H05B 33/0815* (2013.01); *H02M 7/217* (2013.01); *H02M 2001/007* (2013.01); *H02M 2001/0025* (2013.01)

(58) Field of Classification Search
CPC .............. H02M 2001/007; H02M 2001/0025; H02M 3/156; H02M 3/33507; H05B 33/0815; H05B 33/0818
See application file for complete search history.

(56) References Cited

U.S. PATENT DOCUMENTS

2012/0056560 A1* 3/2012 Iwai et al. .................... 315/297
2014/0217918 A1* 8/2014 Knoedgen et al. ............ 315/224

FOREIGN PATENT DOCUMENTS

| JP | 10-243652 A | 11/1998 |
| JP | 2010-140675 A | 6/2010 |
| JP | 2012-049273 A | 3/2012 |

OTHER PUBLICATIONS

A Japanese Office Action issued on Jul. 15, 2014 in the corresponding JP Patent Application 2013-038578, 2 pages.

* cited by examiner

*Primary Examiner* — Harry Behm
(74) *Attorney, Agent, or Firm* — Carrier Blackman & Associates, P.C.; Joseph P. Carrier; Jeffrey T. Gedeon

(57) ABSTRACT

A load driver includes: a rectifying unit configured to rectify an AC voltage from a power source to generate a first voltage; a first converter configured to convert the first voltage outputted from the rectifying unit into a second voltage; a second converter configured to drive a load with a constant current, based on the second voltage converted by the first converter; and a feedback unit configured to generate feedback information, based on information obtained from the second converter and indicating an output voltage when the second converter drives the load with the constant current, wherein the first converter converts the first voltage into the second voltage having a magnitude based on the feedback information obtained from the feedback unit.

7 Claims, 8 Drawing Sheets

LOAD DRIVER WITH FIRST AND SECOND SERIES CONVERTERS

CROSS-REFERENCE TO RELATED APPLICATION

This application claims priority from Japanese Patent Application No. 2013-038578 filed on Feb. 28, 2013, the entire subject matter of which is incorporated herein by reference.

TECHNICAL FIELD

This disclosure relates to a load driver, and more particularly, to a load driver of a two-converter type.

BACKGROUND

A load driver converts an AC voltage supplied from an AC power source, such as a commercial power source, into a DC voltage to supply it to a load. The load driver is mounted on a power-supply device or an illumination device, for example. One load driver includes a circuit configuration of a two-converter type for the purpose of eliminating a pulsating component (ripple noise) or the like in the AC voltage. As the load driver of the related art, for example, a power-supply device including a circuit configuration of a two-converter type is disclosed in JP-A-2010-140675.

The power-supply device disclosed in JP-A-2010-140675 includes a rectifying unit for rectifying an AC voltage from a commercial power source, a first converter unit provided at a subsequent part of the rectifying unit, and a second converter unit configured by a step-up chopper circuit provided at a subsequent part of the first converter unit. The step-up chopper circuit outputs a DC voltage stabilized at a desired voltage or current to a load unit configured by one or plural light emitting diodes.

SUMMARY

However, the technique disclosed in JP-A-2010-140675 has the following problem.

When the stabilized DC current is supplied to the load unit, the output voltage outputted from the second converter unit is varied by temperature changes in a load of the load unit, a difference in performance of each element constituting the load unit, or the like. Accordingly, in order to address the variation in the output voltage from the second converter unit, the output voltage outputted from the first converter unit was set to a constant value, in which a certain level of differences to the minimum value or the maximum value of the output voltage from the second converter unit is set.

Specifically, if the voltage is boosted in the second converter unit, the output voltage from the first converter unit is set to a constant value lower than the minimum value of the output voltage from the second converter unit. If the voltage is stepped down by the second converter unit, the output voltage from the first converter unit is set to a constant value higher than the maximum value of the output voltage from the second converter unit. As a result, since a difference between the output voltage from the first converter unit and the output voltage from the second converter unit is large, there is a problem of deteriorating its efficiency.

If the load unit is configured by a plurality of light emitting diodes (hereinafter sometimes referred to as LED (Light Emitting Diode) connected in series to each other, a required value of the output voltage is varied depending upon the number of LEDs (the number of series-connected LEDs). Accordingly, each of the first and second converter units has to be designed to output the output voltage in accordance with the number of LEDs. As a result, it is necessary to design the load driver depending upon a variation of the load.

In view of the above, this disclosure provides at least a load driver having a good efficiency.

This disclosure also provides a load driver, in which a design in accordance with a variation of a load is not necessary.

A load driver according to one aspect of this disclosure includes a rectifying unit configured to rectify an AC voltage from a power source to generate a first voltage; a first converter configured to convert the first voltage outputted from the rectifying unit into a second voltage; a second converter configured to drive a load with a constant current, based on the second voltage converted by the first converter; and a feedback unit configured to generate feedback information, based on information obtained from the second converter and indicating an output voltage when the second converter drives the load with the constant current, wherein the first converter converts the first voltage into the second voltage having a magnitude based on the feedback information obtained from the feedback unit.

In the above-described load driver, the first converter may convert the first voltage into the second voltage having a magnitude so that a difference between the second voltage and the output voltage becomes a desired value.

In the above-described load driver, the feedback unit may include: a reference voltage generating unit configured to generate a second reference voltage, based on the output voltage and the first reference voltage which is a constant voltage; and a feedback generating unit configured to generate a feedback voltage as the feedback information, based on the second reference voltage and the second voltage.

In the above-described load driver, the reference voltage generating unit may include a reference voltage setting circuit configured to output the second reference voltage if the first reference voltage and the output voltage are inputted, and the feedback generating unit may include an error amplification circuit configured to output an error current according to a difference between the second reference voltage and the divided voltage, if the second reference voltage and a divided voltage of the second voltage is inputted.

In the above-described load driver, the feedback voltage generating unit may include a feedback voltage output circuit configured to output the feedback voltage having a magnitude according to the error current.

In the above-described load driver, the reference voltage setting circuit may include a differentiation circuit configured to control a magnitude of the second voltage when starting of the load driver.

The above-described load driver may includes a reference voltage source configured to output the first reference voltage if the second voltage is inputted.

In the above-described load driver, each of the first and second converters may be a converter having any one of step-up function and a step-down function In the above-described load driver, the first voltage generated from the rectifying unit may be any one of a voltage, which is rectified from the AC voltage, and a voltage, which is rectified and smoothed from the AC voltage.

With the above configuration, this disclosure can provide the load driver having the good efficiency. Further, this disclosure can provide the load driver, in which a design in accordance with the variation of the load is not necessary.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

One embodiment of this disclosure will now be described with reference to the accompanying drawings.

Figure 1:
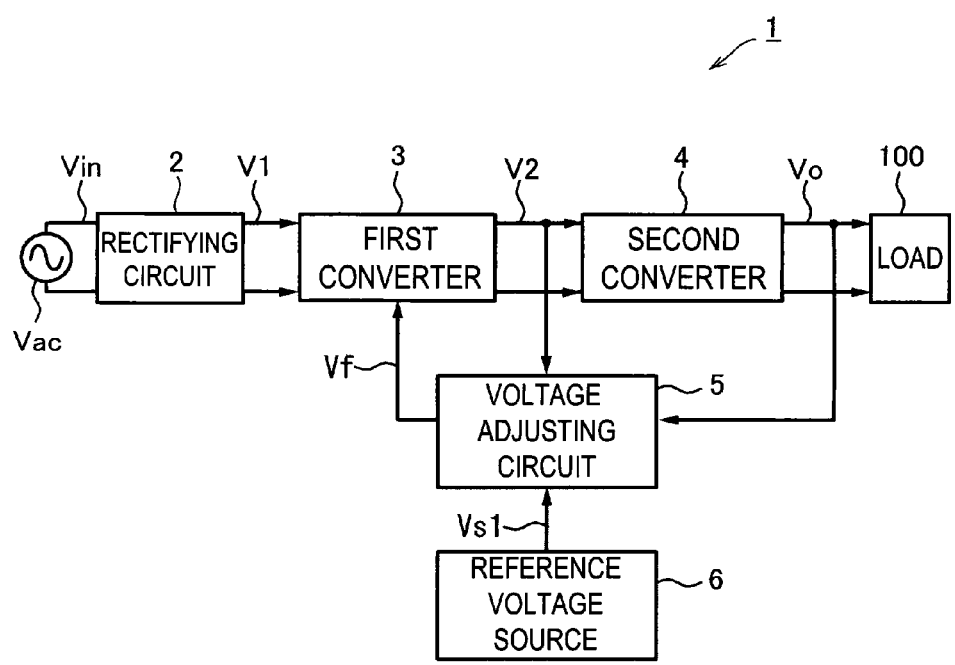
FIG. 1 is a block diagram illustrating the schematic configuration of a load driver 1 according to one embodiment of this disclosure.

FIG. 1 is a block diagram illustrating the schematic configuration of a load driver 1 according to one embodiment of this disclosure.

As illustrated in FIG. 1, the load driver 1 according to this embodiment is a device for driving a load 100, and includes a rectifying circuit 2 (one example of a rectifying unit), a first converter 3, a second converter 4, a voltage adjustment circuit 5 (one example of a feedback unit), and a reference voltage source 6. The rectifying circuit 2 rectifies an AC voltage Vin from an AC source Vac (one example of a power source) to generate a first voltage V1. The first converter 3 converts the first voltage V1 outputted from the rectifying circuit 2 into a second voltage V2 having a magnitude based on a feedback voltage Vf (one example of feedback information) acquired from the voltage adjustment circuit 5. The second converter 4 outputs an output voltage Vo to the load 100 based on the second voltage V2 converted by the first converter 3, thereby driving the load 100 with a constant current. The reference voltage source 6 outputs the first reference voltage Vs1 to the voltage adjustment circuit 5. The voltage adjustment circuit 5 outputs the feedback voltage Vf to the first converter 3 based on the first reference voltage Vs1 and the output voltage Vo (one example indicative of the output voltage when the load 100 is driven with the constant current) of the second converter 4 acquired from the second converter 4. The output voltage Vo is information indicating the output voltage when the second converter 4 drives the load 100 with the constant current.

Additionally, instead of the reference voltage source 6 on the load driver 1, a reference voltage source having a different configuration from the load driver 1 may be connected to the load driver 1, and the first reference voltage Vs1 from the reference voltage source may be supplied to the voltage adjustment circuit 5.

Next, the circuit configuration and operation of the load driver 1 according to this embodiment will be described.

Figure 2:
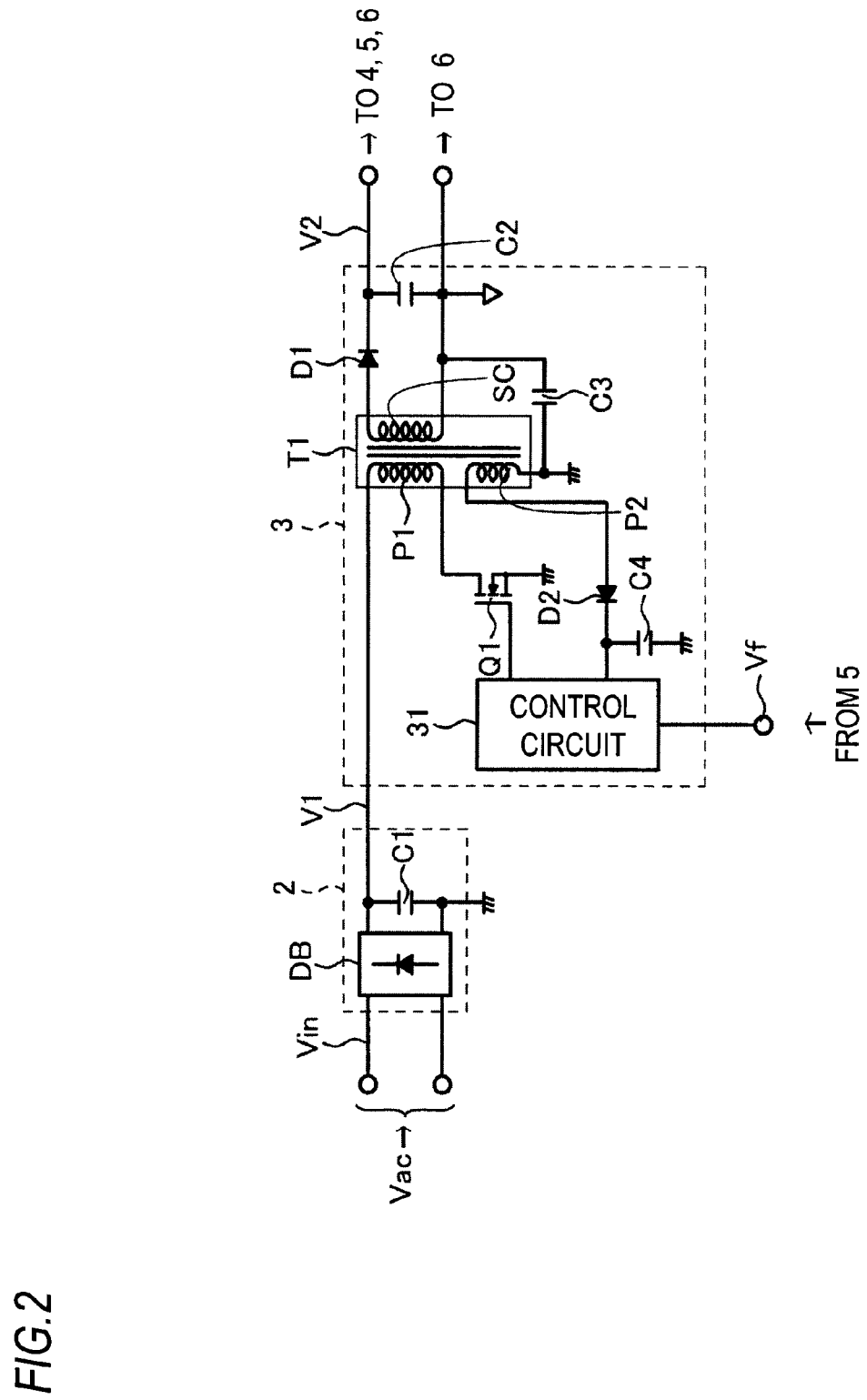
FIG. 2 is a circuit diagram illustrating the detailed configuration of a rectifying circuit 2 and a first converter 3 of the load driver 1 according to one embodiment of this disclosure.
Figure 3:
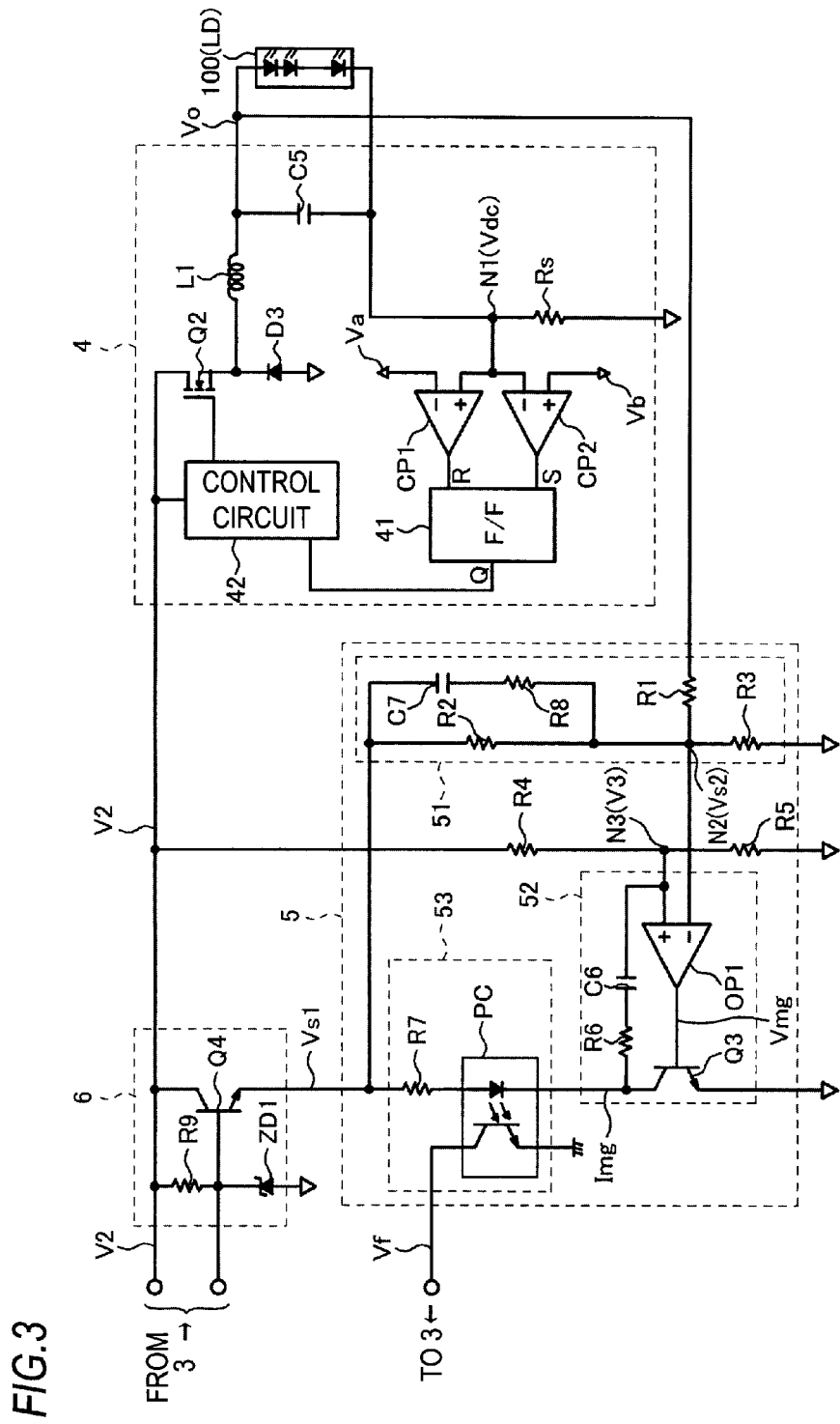
FIG. 3 is a circuit diagram illustrating the detailed configuration of a second converter 4, a voltage adjustment circuit 5, and a reference voltage source 6 of the load driver 1 according to one embodiment of this disclosure.

FIGS. 2 and 3 are circuit diagrams illustrating the concrete configuration of the load driver 1 according to one embodiment of this disclosure. FIG. 2 is a circuit diagram illustrating the detailed configuration of the rectifying circuit 2 and the first converter 3 of the load driver 1. FIG. 3 is a circuit diagram illustrating the detailed configuration of the second converter 4, the voltage adjustment circuit 5, and the reference voltage source 6 of the load driver 1.

As illustrated in FIG. 2, the rectifying circuit 2 rectifies the AC voltage Vin outputted from the AC source Vac to generate the first voltage V1. The rectifying circuit 2 is a rectifying-smoothing circuit for rectifying and smoothing the AC voltage using a capacitor C1 as a smoothing capacitor, and includes a diode bridge DB and the capacitor C1. Two input terminals of the diode bridge DB are respectively connected to two output terminals of the AC source Vac. The capacitor C1 is connected between two output terminals of the diode bridge DB. A first electrode of the capacitor C1 is connected to the first converter 3 as the output terminal of the rectifying circuit 2. A second electrode of the capacitor C1 is grounded to a primary side GND (ground).

The diode bridge DB full-wave rectifies the AC voltage Vin (e.g., 100V to 242V) of the AC source Vac as a full-wave rectifying circuit. The capacitor C1 smoothes the output voltage of the diode bridge DB to generate the first voltage V1.

The first voltage V1 contains a pulsating component, but a magnitude of a pulsating component depends on the capacitor C1. As the capacitance of the capacitor C1 is increased, the pulsating component of the first voltage V1 is decreased.

Instead of the rectifying-smoothing circuit such as the rectifying circuit 2, the rectifying unit may include the capacitor C1, which has no smoothing function, only to simply convert (rectifying the AC voltage) an AC power into a DC power. Further, the rectifying unit may be a half-wave rectifying circuit, instead of the full-wave rectifying circuit, such as the rectifying circuit 2. If the rectifying unit is the full-wave rectifying circuit, a full-wave rectifying circuit of a center-tap type using a center tap which is mounted on a transformer constituting the AC source Vac may be used, as well as using the above-described diode bridge.

The first converter 3 is a step-down converter (converter having a step-down function), and converts the first voltage V1 outputted from the rectifying circuit 2 into the second voltage V2 (e.g., about 40V) lower than the first voltage V1. The first converter 3 is an insulated flyback converter. The first converter 3 includes a transformer T1, a switching element Q1, diodes D1 and D2, capacitors C2 and C3, and a control circuit 31.

The transformer T1 has a primary coil P1, an auxiliary coil P2, and a secondary coil SC. The primary coil P1 is connected between an output terminal of the rectifying circuit 2 and a drain of the switching element Q1. The first terminal of the auxiliary coil P2 is connected to an anode of the diode D2, and a second terminal of the auxiliary coil P2 is connected to the primary side GND. The first terminal of the second coil SC is connected to an anode of the diode D1, and a cathode of the diode D1 is connected to the second converter 4, the voltage adjustment circuit 5, and the reference voltage source 6, respectively, as the first output terminal of the first converter 3. A second terminal of the secondary coil SC is connected to the reference voltage source 6 as the second output terminal of the first converter 3. The capacitor C2 is connected between the cathode of the diode D1 and the second terminal of the secondary coil SC.

The switching element Q1 is, for example, an N-channel type MOSFET (Metal-Oxide-Semiconductor Field-Effect Transistor). A gate of the switching element Q1 is connected to the control circuit 31, and a source is grounded to the primary side GND.

The capacitor C3 is connected between the second terminal of the secondary coil SC and the second terminal of the auxiliary coil P2. An electrode of the auxiliary coil P2 in the capacitor C3 is grounded to the primary side GND. A cathode of diode D2 is connected to the control circuit 31. A first electrode of the capacitor C4 is connected between the cathode of the diode D2 and the control circuit 31, and a second electrode of the capacitor C4 is grounded to the primary side GND.

The control circuit 31 controls on/off operation of the switching element Q1 to convert the first voltage V1 into the second voltage V2. Specifically, the control circuit 31 turns the switching element Q1 on to save magnetic energy in the primary coil P1, and then turns the switching element Q1 off to generate the second voltage V2 which is stepped down, at the secondary coil SC. As a result, the second voltage V2 is outputted from the first converter 3.

The control circuit 31 is connected to the output terminal of the voltage adjustment circuit 5. The control circuit 31 adjusts the magnitude of the second voltage V2, based on the feedback voltage Vf outputted from the voltage adjustment circuit 5, so that a difference between the second voltage V2 and the output voltage Vo described later becomes a desired value. Specifically, the control circuit 31 lowers the second voltage V2 if the feedback voltage Vf indicates that the difference between the second voltage V2 and the output voltage Vo is larger than the desired value. Meanwhile, the control circuit 31 increases the second voltage V2 if the feedback voltage Vf indicates that the difference between the second voltage V2 and the output voltage Vo is smaller than the desired value. The magnitude of the second voltage V2 is adjustable by a switching cycle of the switching element Q1.

The control circuit 31 is operated by the electricity outputted from the voltage source configured by the auxiliary coil P2, the diode D2, and the capacitor C4.

The second voltage V2 contains a pulsating component, but a magnitude of a pulsating component depends on a capacitance of the capacitor C2. As the capacitance of the capacitor C2 is increased, the pulsating component of the second voltage V2 is decreased.

The first converter 3 may be a non-isolated converter, an isolated forward converter, a non-isolated flyback converter, a half-bridge converter, or a full-bridge converter, instead of the insulated flyback converter. The first converter 3 may be a step-up converter (converter having a step-up function), instead of the step-up converter. The first converter 3 may be a low-side switching type, instead of the above-described high-side switching type. The switching element Q1 may be a NPN-type bipolar transistor, instead of an N-channel type MOSFET.

As illustrated in FIG. 3, the second converter 4 outputs a constant DC current to the load 100, based on the second voltage V2 converted by the first converter 3, as the step-down converter (driving the load 100 with the constant current). The second converter 4 is a non-insulated step-down (back) converter herein. The second converter 4 has a switching element Q2, a diode D3, a capacitor C5, a coil L1, a resistor element Rs, comparators CP1 and CP2, a flip-flop circuit 41, and a control circuit 42. The load 100 is configured by an LED module LD (a series body with a plurality of LEDs connected in series) herein.

The switching element Q2 is an N-channel type MOSFET, for example. A gate of the switching element Q2 is connected to the control circuit 42, and a drain is connected to the first output terminal of the first converter 3, and a source is connected to the cathode of the diode D3 and the first terminal of the coil L1. An anode of the diode D3 is grounded to the secondary side GND.

A non-inverting input terminal of the comparator CP1 and an inverting input terminal of the comparator CP2 are short-circuited, and are connected to a node N1. A reference voltage Va defining an upper limit value of a detection voltage Vdc is applied to an inverting terminal of the comparator CP1, and a reference voltage Vb defining a lower limit value of the detection voltage Vdc is applied to a non-inverting terminal of the comparator CP2. An output terminal of the comparator CP1 is connected to a reset terminal R of the flip-flop circuit 41. An output terminal of the comparator CP2 is connected to a set terminal S of the flip-flop circuit 41.

A second terminal of the coil L1 is connected to the first terminal of the load 100 and the voltage adjustment circuit 5, respectively, as the first output terminal of the second converter 4. The node N1 is connected to the second terminal of the load 100, as the second output terminal of the second converter 4.

The capacitor C5 is connected between the second terminal of the coil L1 and the node N1. A first terminal of the resistor element Rs is connected to the node N1, and a second terminal is grounded to the secondary side GND.

The output terminal Q of the flip-flop circuit 41 is connected to the control circuit 42.

The control circuit 42 is connected to the first output terminal of the first converter 3, and is operated by the second voltage V2. The control circuit 42 controls an on/off operation of the switching element Q2 to apply the constant current to the load 100 using the second voltage V2 as the voltage source. As a result of that the constant current is applied to the load 100, the second converter 4 outputs the output voltage Vo to the load 100. Specifically, as the control circuit 42 turns the switching element Q2 on, the magnetic energy is saved in the coil L1. After that, as the switching element Q2 is turned off, the constant current is applied to the load 100. The magnitude of the current flowing in the load 100 can be adjusted by a resistance value of the resistor element Rs.

The current flowing in the load 100 is detected as the detection voltage Vdc to be applied to the node N1 via the resistor element Rs. The detection voltage Vdc is respectively inputted to non-inverting input terminal of the comparator CP1 and the inverting input terminal of the comparator CP2. If the detection voltage Vdc is higher than the reference voltage Va (Vdc>Va), the comparator CP1 outputs a signal to the reset terminal R of the flip-flop circuit 41. If the detection voltage Vdc is lower than the reference voltage Va (Vdc<Va), the comparator CP2 outputs a signal to the set terminal S of the flip-flop circuit 41. If the signal is inputted to the reset terminal R, the flip-flop circuit 41 outputs a low signal from the output terminal Q to the control circuit 42. If the signal is inputted to the set terminal S, the flip-flop circuit 41 outputs a high signal from the output terminal Q to the control circuit 42.

When the low signal is outputted from the flip-flop circuit 41, the control circuit 42 turns the switching element Q2 off. When the high signal is inputted to the flip-flop circuit 41, the control circuit 42 turns the switching element Q2 on. Accordingly, the control circuit 42 adjusts the output voltage Vo so that the current flowing in the load 100 becomes a constant value. The output voltage Vo is within a desired voltage range.

Additionally, the second converter 4 may be a non-isolated flyback converter or an isolated forward converter, instead of a non-insulated choke converter. The second converter 4 may be a step-up converter (in particular, a non-insulated step-up converter), instead of the step-up converter. The second converter 4 may be a low-side switching type, instead of the above-described high-side switching type. The switching element Q2 may be a NPN-type bipolar transistor, instead of an N-channel type MOSFET.

The load is not limited to the light module, such as LED module, but can be applied to any device.

The reference voltage source 6 outputs the first reference voltage Vs1 to the voltage adjustment circuit 5, if the second voltage V2 is inputted thereto. The reference voltage source 6 has a transistor element Q4, a resister element R9, and a zener diode ZD1.

The transistor element Q4 is, for example, an NPN-type bipolar transistor. A collector of the transistor element Q4 is connected to the first output terminal of the first converter 3, a base is connected to the second output terminal of the first converter 3, and an emitter is connected to the voltage adjustment circuit 5, as an output terminal of the reference voltage source 6.

A first terminal of the resistor element R9 is connected between the first output terminal and the second output terminal of the first converter 3. A cathode of the zener diode ZD1 is connected to the second output terminal of the first converter 3, and an anode is grounded to the secondary side GND.

Even though the second voltage V2 is raised or lowered, the reference voltage source 6 outputs the first reference voltage Vs1 which is the constant voltage, to the voltage adjustment circuit 5, based on a threshold voltage determined by the zener diode ZD1.

Additionally, if the second voltage is inputted, the reference voltage source may output the first reference voltage, and may be configured other than the reference voltage source 6. Further, the load driver 1 may not include the reference voltage source, as described above. Meanwhile, since the load driver 1 includes the reference voltage source therein, it is not necessary to receive the first reference voltage from the exterior.

The transistor element Q4 may be an FET or the like, instead of an NPN-type bipolar transistor.

The voltage adjustment circuit 5 includes a reference voltage setting circuit 51 (one example of a reference voltage generating unit), an error amplification circuit 52, a feedback voltage output circuit 53, and resistor elements R4 and R5. The reference voltage setting circuit 51 is connected to the output terminal of the reference voltage source 6, the first output terminal of the second converter 4, and the secondary side GND. The resistor elements R4 and R5 are in series connected between the first output terminal of the first converter 3 and the secondary side GND in this order. A third voltage V3 is applied to a node N3 between the resistor element R4 and the resistor element R5. The third voltage V3 is a divided voltage of the second voltage V2. The error amplification circuit 52 is connected to the output terminal (node N2) of the reference voltage setting circuit 51 and the node N3, respectively. The feedback voltage output circuit 53 is connected to the output terminal of the reference voltage source 6 and the output terminal of the error amplification circuit 52. The output terminal of the feedback voltage output circuit 53 is connected to the first converter 3.

The reference voltage setting circuit 51 has resistor elements R1, R2, R3 and R8 and a capacitor C7. A first end of the resistor element R1 is connected to the first output terminal of the second converter 4, and a second end of the resistor element R1 is connected to the node N2. The resistor element R2 is connected between the output terminal of the reference voltage source 6 and the node N2. The resistor element R3 is connected between the node N2 and the secondary side GND. The capacitor C7 and the resistor element R8 are connected in series between the output terminal of the reference voltage source 6 and the node N2 in this order.

The error amplification circuit 52 has an operational amplifier OP1, a transistor element Q3, a resistor element R6, and a capacitor C6. A non-inverting terminal of the operational amplifier OP1 is connected to the node N3, an inverting terminal is connected to the node N2, and an output terminal is connected to a base of the transistor element Q3. The capacitor C6 is connected between the non-inverting terminal of the operational amplifier OP1 and a first terminal of the resistor element R6. A second terminal of the resistor element R6 is connected to the feedback voltage output circuit 53 as the output terminal of the error amplification circuit 52. The transistor element Q3 is, for example, an NPN-type bipolar transistor. A collector of the transistor element Q3 is connected to the second terminal of the resistor element R6, and an emitter is grounded to the secondary side GND. The resistor element R6 and the capacitor C6 determine a gain and a phase of the error amplification circuit 52.

The feedback voltage output circuit 53 has a resistor element R7 and a photo-coupler PC. A first end of the resistor element R7 is connected to the output terminal of the reference voltage source 6, and a second terminal is connected to an anode of the photo-coupler PC. A cathode of the photo-coupler PC is connected to the output terminal of the error amplification circuit 52. A collector of the photo-coupler PC is connected to the first converter 3 as the output terminal of the feedback voltage output circuit 53, and an emitter of the photo-coupler PC is grounded to the primary side GND.

The reference voltage setting circuit 51 outputs the second reference voltage Vs2 to the error amplification circuit 52 if the first reference voltage Vs1 and the output voltage Vo are inputted thereto. That is, the second reference voltage Vs2 is varied depending on the magnitude of the output voltage Vo. The magnitude of the second reference voltage Vs2 which is outputted to the node N2 by the reference voltage setting circuit 51 can be adjusted by the first reference voltage Vs1 and values of the resistor elements R1, R2 and R3. Specifically, the following formula (1) is accomplished among the second reference voltage Vs2, the first reference voltage Vs1, the output voltage Vo, and the resistor elements R1, R2 and R3.

$$Vs2 = R3 \times \{Vo/(R1 + ((R1 \times R3)/(R1+R3))) \times R2/(R2+R3) + Vs1/(R2 + ((R1 \times R3)/(R1+R3))) \times R1/(R1+R3))\} \quad (1)$$

The reference voltage setting circuit 51 has a differentiation circuit configured by the capacitor C7 and the resistor elements R3 and R8. The differentiation circuit increases the second reference voltage Vs2 of the node N2 when starting of the load driver 1. A virtual short is established between the node N2 and the node N3, and the second reference voltage Vs2 and the third voltage V3 are equal. Therefore, if the second reference voltage Vs2 is increased, the third voltage V3 is increased, and thus the second voltage V2 is increased. As a result, when starting of the load driver 2, the second voltage V2 is sustained larger than a desired voltage (output voltage Vo), so that the second converter 4 can be reliably started as the step-down converter.

Additionally, the differentiation circuit may have other configuration, and may control the magnitude of the second voltage V2 when starting of the load driver 1.

The error amplification circuit 52 and the feedback voltage output circuit 53 configures a feedback voltage generating unit for generating the feedback voltage Vf based on the second reference voltage Vs2 and the third voltage V3.

The error amplification circuit 52 outputs an error current Img according to a difference between the second reference voltage Vs2 and the third voltage V3 to the feedback voltage output circuit 53 if the second reference voltage Vs2 and the third voltage V3 are inputted thereto. The feedback voltage output circuit 53 outputs the feedback voltage Vf having the magnitude according to the error current Img to the first converter 3. The operational amplifier OP1 outputs, to the base of the transistor element Q3, the error voltage Vmg according to the difference between the second reference voltage Vs2 applied to the node N2 and the third voltage V3 applied to the node N3. Accordingly, the error current Img according to the magnitude of the error voltage Vmg flows between the photo-coupler PC and the collector and the emitter of the transistor element Q3.

If the transistor element Q3 is turned on, the magnitude of a diode current (error current Img) flowing in the photo-coupler PC is controlled in accordance with which the voltage of the third voltage V3 and the second reference voltage Vs2 is higher, and the feedback voltage Vf is set by the magnitude of the diode current flowing in the photo-coupler PC. The control circuit 31 sets the magnitude of the second voltage V2 so that the third voltage V3 and the second reference voltage Vs2 are equal.

Specifically, if the third voltage V3 is higher than the second reference voltage Vs2 (i.e., the difference between the second voltage V2 and the output voltage Vo is higher than a desired value), the diode current (error current Img) of the photo-coupler PC is lowered, and thus the current flowing between the collector and the emitter of the photo-coupler PC is lowered. As a result, the feedback voltage Vf having the magnitude according to that current is outputted to the first converter 3, and thus the second voltage V2 is lowered by the control circuit 31. If the third voltage V3 is lower than the second reference voltage Vs2 (i.e., the difference between the second voltage V2 and the output voltage Vo is lower than a desired value), the diode current (error current Img) of the photo-coupler PC is increased, and thus the current flowing between the collector and the emitter of the photo-coupler PC is increased. As a result, the feedback voltage Vf having the magnitude according to that current is outputted to the first converter 3, and thus the second voltage V2 is increased by the control circuit 31.

As long as the feedback unit generates the feedback information, based on the information obtained from the second converter and indicating the output voltage when the second converter drives the load with the constant current, the feedback unit may include a configuration other than the voltage adjustment circuit 5.

If the feedback unit includes the reference voltage generating unit and the feedback voltage generating unit, as long as the reference voltage generating unit generates the second reference voltage based on the output voltage and the first reference voltage which is the constant voltage, it may include a configuration other than the reference voltage setting circuit 51. The reference voltage setting circuit 51 may not include the differentiation circuit. The feedback voltage generating unit may generate the feedback voltage as the feedback information, based on the second reference voltage and the second voltage, and may include a configuration other than the error amplification circuit 52 and the feedback voltage output circuit 53.

In a case where the feedback voltage generating unit is configured by the error amplification circuit and the feedback voltage output circuit, when the second reference voltage and the divided voltage of the second voltage are inputted, as long as the error amplification circuit outputs an error current in accordance with the difference between the second reference voltage and the divided voltage of the second voltage, it may include a configuration other than the error amplification circuit 52. as long as the feedback voltage output circuit outputs the feedback voltage in accordance with the error current, it may include a configuration other than the feedback voltage output circuit 53.

Similar to this embodiment, if the photo-coupler PC is used as a switching element for defining the feedback voltage Vf, the primary coil P1 and the secondary coil SC of the first converter 3 can be insulated. If it is not necessary to insulate the coils, other switching element, such as a bipolar transistor or a MOSFET, may be used as the switching element for defining the feedback voltage Vf, instead of the photo-coupler PC.

The transistor element Q3 may be an FET or the like, instead of the NPN-type bipolar transistor.

The effect of the load driver 1 according to this embodiment will now be described.

Figure 4:
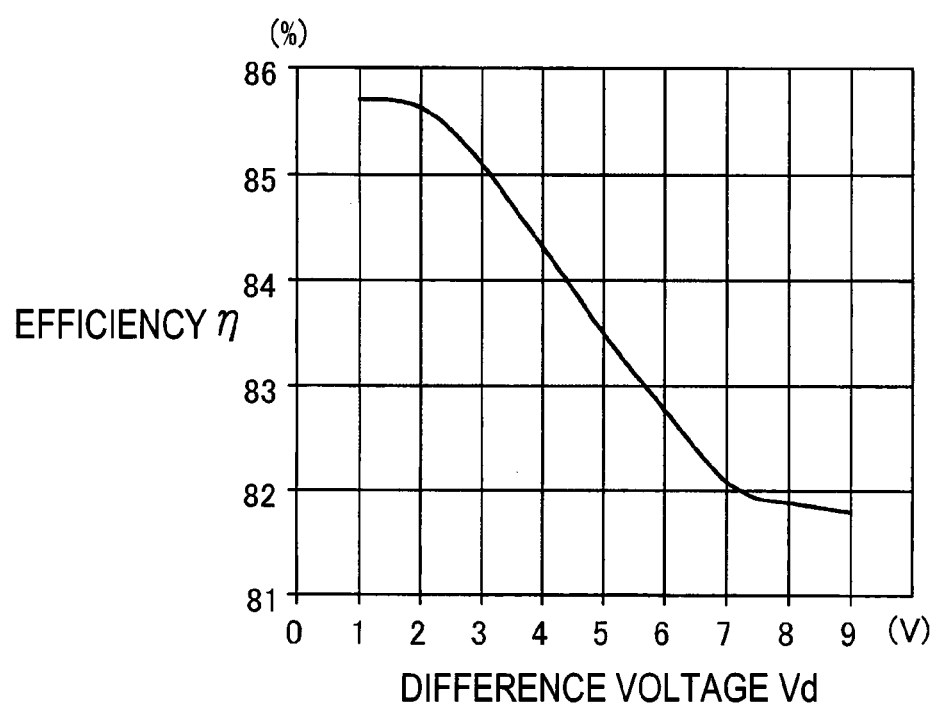
FIG. 4 is a diagram schematically illustrating a relation of a difference voltage Vd and an efficiency of the load driver.

FIG. 4 is a diagram schematically illustrating a relation of the difference voltage Vd and an efficiency η of the load driver. Additionally, the difference voltage Vd is a voltage which is defined by a difference between the second voltage V2 and the output voltage Vo (V2−Vo).

As illustrated in FIG. 4, it would be appeared that, as the difference voltage Vd gets lower, the efficiency of the load driver gets higher. A load driver of the related art sets the output voltage of the first converter portion at a constant value in view of the variation of the output voltage of the second converter portion due to the load variations (temperature change in a load of a load unit, or a gap of performance of each element constituting the load unit). That is, the output voltage of the first convert portion is set to a constant value to be increased larger than the maximum value if the output voltage of the second converter portion is varied. As a result, there is a problem in that a difference between the output voltage of the first convert and the output voltage of the second converter portion is increased, thereby deteriorating the efficiency. For example, if the difference voltage Vd is 7V (e.g., the output voltage of the second converter portion is 36V, and the output voltage of the first converter portion is 43V), the efficiency is about 82%.

Meanwhile, according to the load driver 1 of this embodiment, since the magnitude of the second voltage V2 (output voltage of the first converter) is changed in accordance with the load variations (variation in the output voltage Vo of the second converter), it is not necessary to set the second voltage V2 at a constant value in view of the load variations, and the difference between the second voltage V2 and the output voltage Vo (output voltage of the second converter) can be reduced. For example, if the difference voltage Vd is 3V (e.g., the output voltage Vo is 36V, and the second voltage is 39V), the efficiency is about 85%, which is higher by about 3% than the related art. As a result, the efficiency of the second converter 4 can be improved, and thus the load driver having the high efficiency can be provided.

Further, according to the load driver 1 of this embodiment, it is not necessarily to be designed in accordance with the variation of the load. For example, in a case where the number of series is 12 and 14, respectively, for the load of LEDs, it is possible to drive the load with the load driver 1 of the same circuit configuration unless the magnitude of the load is extremely changed.

First Modification

Figure 5:
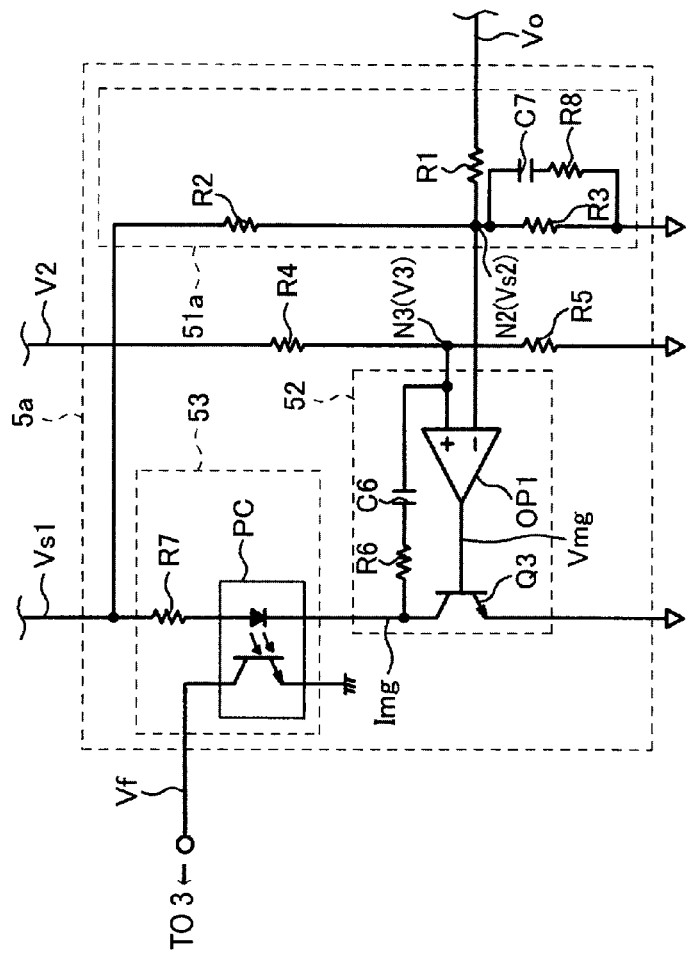
FIG. 5 is a circuit diagram illustrating the detailed configuration of a voltage adjustment circuit 5a according to a first modification of this disclosure.

FIG. 5 is a circuit diagram illustrating the detailed configuration of a voltage adjustment circuit 5a according to the first modification of this disclosure.

As illustrated in FIG. 5, the modification is similarly to the above-described embodiment, except for that the second converter is the step-up converter, and a reference voltage setting circuit 51a of the voltage adjustment circuit 51 is different from the reference voltage setting circuit of the above-described embodiment.

Specifically, the reference voltage setting circuit 51a of the voltage adjustment circuit 5a has resistor elements R1, R2, R3 and R8 and a capacitor C7. A first end of the resistor element R1 is connected to the first output terminal of the second converter 4, and a second end is connected to the node N2. The second reference voltage Vs2 is applied to the node N2. The resistor element R2 is connected between the output terminal of the reference voltage source 6 and the node N2. The resistor element R3 is connected between the node N2 and the secondary side GND. The capacitor C7 and the resistor element R8 are connected in series between the node N2 and the secondary side GND (in parallel to the resistor element R3) in this order.

The reference voltage setting circuit 51a includes a differentiation circuit configured by the capacitor C7 and the resistor elements R2 and R8. The differentiation circuit lowers the second reference voltage Vs2 of the node N2 when starting of the load driver 1. If the second reference voltage Vs2 is lowered, the third voltage V3 is also lowered, and thus the second voltage V2 is lowered. As a result, it is possible to sustain the second voltage V2 lower than a desired voltage (output voltage Vo) when starting of the load driver 1, thereby reliably starting the second converter 4 as the step-up converter.

Additionally, since other configuration and operation of the load driver are similarly to the above-described embodiment, same reference numerals are put to elements identical to those, and the description thereof is omitted herein.

Second Modification

Figure 6:
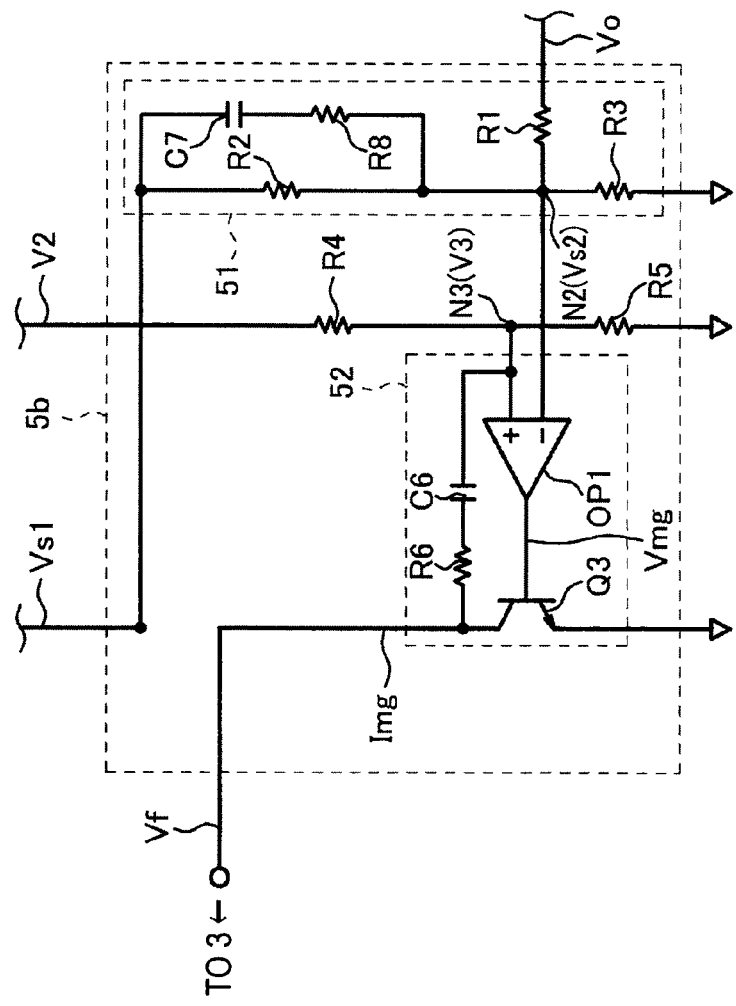
FIG. 6 is a circuit diagram illustrating the detailed configuration of a voltage adjustment circuit 5b according to a second modification of this disclosure.

FIG. 6 is a circuit diagram illustrating the detailed configuration of a voltage adjustment circuit 5b according to the second modification of this disclosure.

As illustrated in FIG. 6, the modification is similarly to the above-described embodiment, except for that the voltage adjustment circuit 5b does not include the feedback voltage output circuit of the above-described embodiment.

Specifically, in the error amplification circuit 52 of the voltage adjustment circuit 5b, the capacitor C6 is connected between the non-inverting terminal of the operational amplifier OP1 and the first terminal of the resistor element R6. The second terminal of the resistor element R6 is connected to the first converter 3 as the output terminal of the voltage adjustment circuit 5b. The collector of the transistor element Q3 is connected to the second terminal of the resistor element R6, and emitter is grounded to the secondary side GND.

The operational amplifier OP1 outputs to the base of the transistor element Q3 the error voltage Vmg according to the difference between the second reference voltage Vs2 applied to the node N2 and the third voltage V3 applied to the node N3. Accordingly, the error current Img according to the magnitude of the error voltage Vmg flows between the collector and the emitter of the transistor element Q3, and the feedback voltage Vf according to the error current Img is outputted to the first converter 3. As a result, the control circuit 31 controls the magnitude of the second voltage V2 in accordance with the output voltage of the operational amplifier OP1. Additionally, the first converter 3 is preferably a non-insulated type in this modification.

According to the modification, since the feedback voltage output circuit can be omitted, it is possible to simplify the configuration of the load driver.

Additionally, since other configuration and operation of the load driver are similarly to the above-described embodiment, same reference numerals are put to elements identical to those, and the description thereof is omitted herein.

Third Modification

Figure 7:
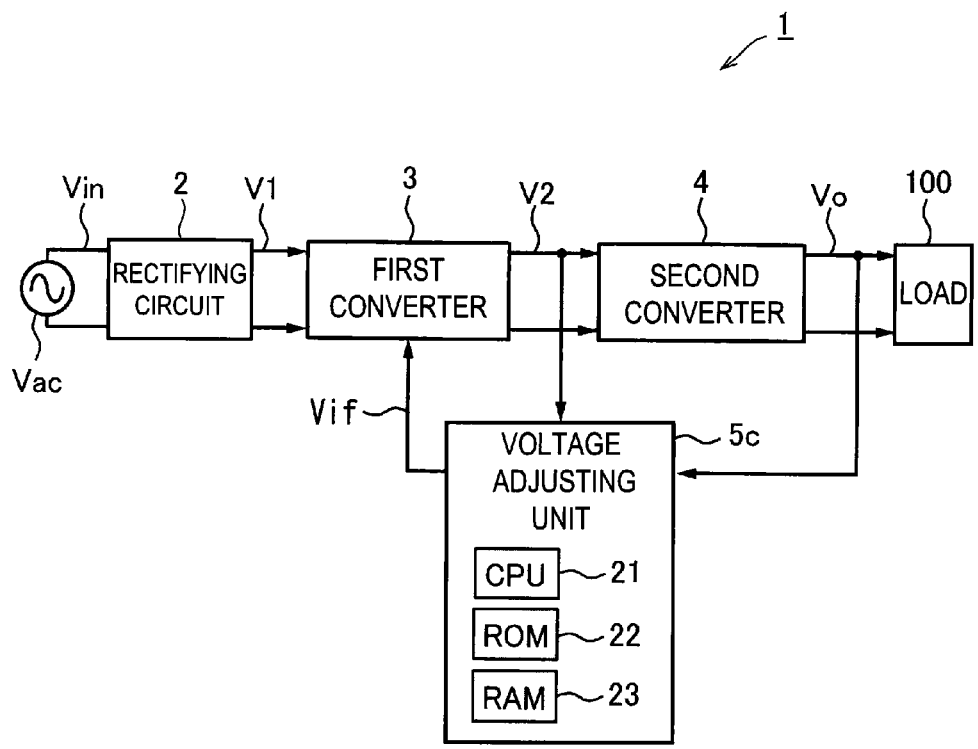
FIG. 7 is a circuit diagram illustrating the schematic configuration of the load driver 1 according to a third modification of this disclosure.

FIG. 7 is a circuit diagram illustrating the schematic configuration of the load driver 1 according to the third modification of this disclosure.

As illustrated in FIG. 7, the modification is similarly to the above-described embodiment, except for that the load driver includes a voltage adjustment unit 5c, instead of the voltage adjustment circuit of the above-described embodiment, and does not include the reference voltage source of the above-described embodiment.

Specifically, the voltage adjustment unit 5c outputs feedback information Vif to the first converter 3, based on the second voltage V2 from the first converter 3 and the output voltage Vo of the second converter 4 from the second converter 4. The voltage adjustment unit 5c includes a CPU (Central Processing Unit) 21, a ROM (Read Only Memory) 22, and a RAM (Random Access Memory) 23. The CPU 21 executes a control program stored in the ROM 22. The ROM 22 is stored with various programs for performing the operation of the load driver 1, and various fixed data. The RAM 23 temporarily stores data required when the CPU 21 executes the control program.

Figure 8:
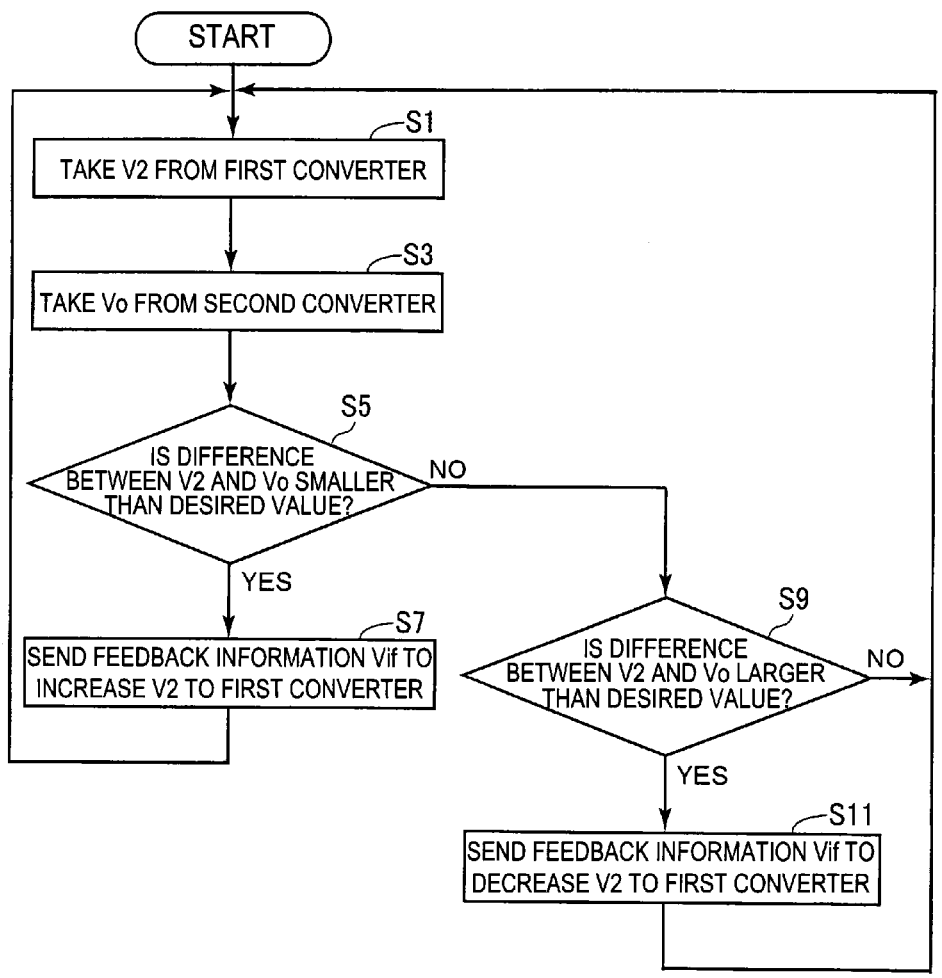
FIG. 8 is a flowchart illustrating an operation of the load driver 1 according to the third modification of this disclosure.

FIG. 8 is a flowchart illustrating an operation of the load driver 1 according to the third modification of this disclosure.

As illustrated in FIG. 8, when starting of the load driver 1, the CPU 21 of the voltage adjustment unit 5c takes a value of the second voltage V2 from the first converter 3 (S1), and takes a value of the output voltage Vo from the second converter 4 (S3). Subsequently, the CPU 21 determines whether a difference between the second voltage V2 and the output voltage Vo is smaller than a desired value or not (S5).

In step S5, if it is determined that the difference between the second voltage V2 and the output voltage Vo is lower than the desired value (YES in step S5), the second voltage V2 is in a too low state. The CPU 21 sends the feedback information Vif for increasing the second voltage V2 to the first converter 3 (S7), and proceeds to the processing of step S1.

In step S5, if it is determined that the difference between the second voltage V2 and the output voltage Vo is not lower than the desired value (NO in step S5), the CPU 21 determines whether the difference between the second voltage V2 and the output voltage Vo is larger than the desired value (S9).

In step S9, if it is determined that the difference between the second voltage V2 and the output voltage Vo is larger than the desired value (YES in step S9), the second voltage V2 is in a too high state. The CPU 21 sends the feedback information Vif for lowering the second voltage V2 to the first converter 3 (S11), and proceeds to the processing of step S1.

In step S9, if it is determined that the difference between the second voltage V2 and the output voltage Vo is not higher than the desired value (NO in step S9), the second voltage V2 is in the state equal to the desired value. The CPU 21 does not send the feedback information Vif to the first converter 3, but proceeds to the processing of step S1.

According to the modification, since the feedback information Vif is generated without using the first and second reference voltages by the voltage adjustment unit 5c, the configuration for generating the first and second reference voltages is not necessary, thereby simplifying the configuration of the load driver.

Additionally, since other configuration and operation of the load driver are similarly to the above-described embodiment, same reference numerals are put to elements identical to those, and the description thereof is omitted herein.

Others

The load driver of the above-described embodiment may be mounted on a power-supply device or a load device such as an illumination device.

The embodiment and the modifications can be suitably combined. For example, by combining the first modification and the second modification, a configuration omitting the feedback voltage output circuit may be applied to the configuration, in which the second converter is a step-up converter and the reference voltage setting circuit 51a including the differentiation circuit illustrated in FIG. 5 is employed. Further, it is possible to omit the reference voltage source in the first modification or the second modification.

The processing in the above-described embodiment and the modification may be performed by software or using a hardware circuit. In addition, a program may be provided for executing the processing in the above-described embodiment, and such program may be stored in a recording medium such as a CD-ROM, a flexible disk, a hard disk, an ROM, an RAM, and a memory card, and provided to a user. The program is executed by a computer such as CPU. Furthermore, the program may be downloaded in an apparatus via communication line such as Internet Although the embodiment and the modifications have been described and illustrated in detail, it should be understood that spirit and scope of this disclosure is not limited by above description and will be limited the terms of the appended claims and equivalent thereof.

What is claimed is:

1. A load driver comprising:
   a rectifying unit configured to rectify an AC voltage from a power source to generate a first voltage;
   a first converter configured to convert the first voltage outputted from the rectifying unit into a second voltage;
   a second converter configured to drive a load with a constant current, based on the second voltage converted by the first converter; and
   a feedback unit configured to generate feedback information, based on information obtained from the second converter and indicating an output voltage when the second converter drives the load with the constant current,
   wherein the first converter converts the first voltage into the second voltage having a magnitude so that a difference between the second voltage and the output voltage becomes a desired value, based on the feedback information obtained from the feedback unit,
   wherein the feedback unit includes:
      a reference voltage generating unit configured to use the output voltage and a first reference voltage, which is a constant voltage, to generate a second reference voltage; and
      a feedback generating unit configured to generate a feedback voltage as the feedback information, based on the second reference voltage and the second voltage.

2. The load driver according to claim 1,
   wherein the reference voltage generating unit includes
      a reference voltage setting circuit configured to output the second reference voltage if the first reference voltage and the output voltage are inputted, and
   wherein the feedback generating unit includes
      an error amplification circuit configured to output an error current according to a difference between the second reference voltage and a divided voltage, if the second reference voltage and a divided voltage of the second voltage is inputted.

3. The load driver according to claim 2,
   wherein the feedback voltage generating unit further includes
   a feedback voltage output circuit configured to output the feedback voltage having a magnitude according to the error current.

4. The load driver according to claim 2,
   wherein the reference voltage setting circuit includes
   a differentiation circuit configured to control a magnitude of the second voltage when starting of the load driver.

5. The load driver according to claim 1, further comprising
   a reference voltage source configured to output the first reference voltage if the second voltage is inputted.

6. The load driver according to claim 1,
   wherein each of the first and second converters is a converter having any one of step-up function and a step-down function.

7. The load driver according to claim 1,
   wherein the first voltage generated from the rectifying unit is any one of a voltage, which is rectified from the AC voltage, and a voltage, which is rectified and smoothed from the AC voltage.

* * * * *